(12) United States Patent
Chao

(10) Patent No.: US 9,494,310 B2
(45) Date of Patent: Nov. 15, 2016

(54) DEVICE WITH A WATERPROOF FUNCTION

(71) Applicant: Kuan-Li Chao, Taipei (TW)

(72) Inventor: Kuan-Li Chao, Taipei (TW)

( * ) Notice: Subject to any disclaimer, the term of this patent is extended or adjusted under 35 U.S.C. 154(b) by 0 days.

(21) Appl. No.: 14/742,929

(22) Filed: Jun. 18, 2015

(65) Prior Publication Data

US 2015/0369468 A1 Dec. 24, 2015

(30) Foreign Application Priority Data

Jun. 20, 2014 (TW) .............................. 103121328 A

(51) Int. Cl.
| | | |
|---|---|---|
| *F21V 31/00* | (2006.01) | |
| *F21V 31/04* | (2006.01) | |
| *F21V 23/04* | (2006.01) | |
| *F21L 4/00* | (2006.01) | |
| *H04N 5/225* | (2006.01) | |
| *G03B 17/08* | (2006.01) | |
| *G03B 17/02* | (2006.01) | |

(52) U.S. Cl.
CPC ............... *F21V 31/04* (2013.01); *G03B 17/02* (2013.01); *H04N 5/2252* (2013.01); *F21L 4/005* (2013.01); *F21V 23/0414* (2013.01); *H04N 2005/2255* (2013.01)

(58) Field of Classification Search
CPC .................. G03B 17/08; H04N 5/2252; H05K 5/0217; F21V 31/04
See application file for complete search history.

(56) References Cited

U.S. PATENT DOCUMENTS

| | | | | | |
|---|---|---|---|---|---|
| 3,794,825 | A | * | 2/1974 | Krupansky | ............... F21L 7/00 362/158 |
| 5,996,790 | A | * | 12/1999 | Yamada | ................. G03B 17/08 206/316.1 |
| 6,574,429 | B1 | * | 6/2003 | Smith | ..................... G03B 17/08 396/29 |
| 2009/0260844 | A1 | * | 10/2009 | Tseng | ..................... H05K 5/069 174/50.5 |
| 2015/0369468 | A1 | * | 12/2015 | Chao | .................... H04N 5/2252 361/679.01 |

\* cited by examiner

*Primary Examiner* — W B Perkey
(74) *Attorney, Agent, or Firm* — Alan D. Kamrath; Kamrath IP Lawfirm, P.A.

(57) ABSTRACT

A device with a waterproof function includes a case, an electrical module, at least one sealant and some liquid. The case includes 2 holes and 1 button, the electrical module is connected to the case, and at least one sealant is used to seal the holes of the case to form a closed space to contain the liquid. The liquid filled in the device is not only able to balance the inner and outer pressure of the device but is also used to allow a user smoothly to press the button of the waterproof device by being pressed to transmit pressure to one hole in the case and make the at least one sealant connected to the hole outwardly form the shape of a bulge.

15 Claims, 6 Drawing Sheets

DEVICE WITH A WATERPROOF FUNCTION

BACKGROUND OF THE INVENTION

1. Field of the Invention

The present invention relates to a waterproof device, and especially to a waterproof device that is waterproof even when the device is in an environment with water pressure and that has an electrical device button that is easy to press for a user.

2. Description of the Related Art

Electrical devices, such as cameras, video cameras, and flashlights, are very common today. Different needs lead to hardware designs having different functions, and waterproofing is a common feature of such designs. To prevent the camera lens, the screen, the printed circuit board or the battery module from being immersed in water when a camera is used underwater, many solutions are provided for the consumers, such as a waterproof box or a sealed case with a waterproof function.

However, the button of a waterproof camera, for example, has a feature to resist water pressure, which makes it difficult for the user to press the button when using the waterproof camera in shallow water or out of the water. In addition, the waterproof ability is limited because of the inner design of the common camera, so the camera might still suffer water damage if the dive depth exceeds 18 meters. Furthermore, if the waterproof camera is to be used in deep water, it is necessary to add an additional waterproof case. The button on the waterproof case has a thick waterproofing ring and good pressure-resistance ability, and the waterproof case needs to be specially designed for different cameras.

Therefore, the waterproof design of electrical devices for use under water needs to be improved.

SUMMARY OF THE INVENTION

It is an object of the present invention to provide a device with a waterproof function.

To achieve the abovementioned object, the device with a waterproof function comprises: a case comprising a hole and a button; an electrical module connecting with the case; at least one sealant used to seal the hole and form a closed space by connecting the sealant and the case; and a liquid contained in the closed space; whereby when the button is pressed, the liquid that is under pressure and the at least one sealant will be pushed outward by the pressure and form the shape of a bulge.

According to one embodiment of the present invention, the case further comprises at least one button opening, and the number of the at least one button openings may be 2 in order to seal the hole and the at least one button opening.

According to one embodiment of the present invention, the sealant is an elastic film.

According to one embodiment of the present invention, the case comprises an inner side and an outer side, and the elastic film is connected with the inner side.

According to one embodiment of the present invention, the case comprises an inner side and an outer side, and the elastic film is connected with the outer side.

According to one embodiment of the present invention, the elastic film is a sealing film forming a closed space.

According to one embodiment of the present invention, the sealant further comprises at least one waterproof ring and at least one plunger.

According to one embodiment of the present invention, the liquid is an oily liquid.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

To clarify the above and other purposes, features, and advantages of this invention, a specific embodiment of this invention is especially listed and described in detail with the attached figures as follows.

The present invention presents two representative embodiments for explanation. Two devices with a waterproof function 1, shown as the devices with a waterproof function 1a and 1b, are respectively represented as a waterproof camera and a waterproof flashlight. An electronic module is also respectively represented as an image capture module 30a and a lighting module 30b to describe the embodiments.

Figure 1:
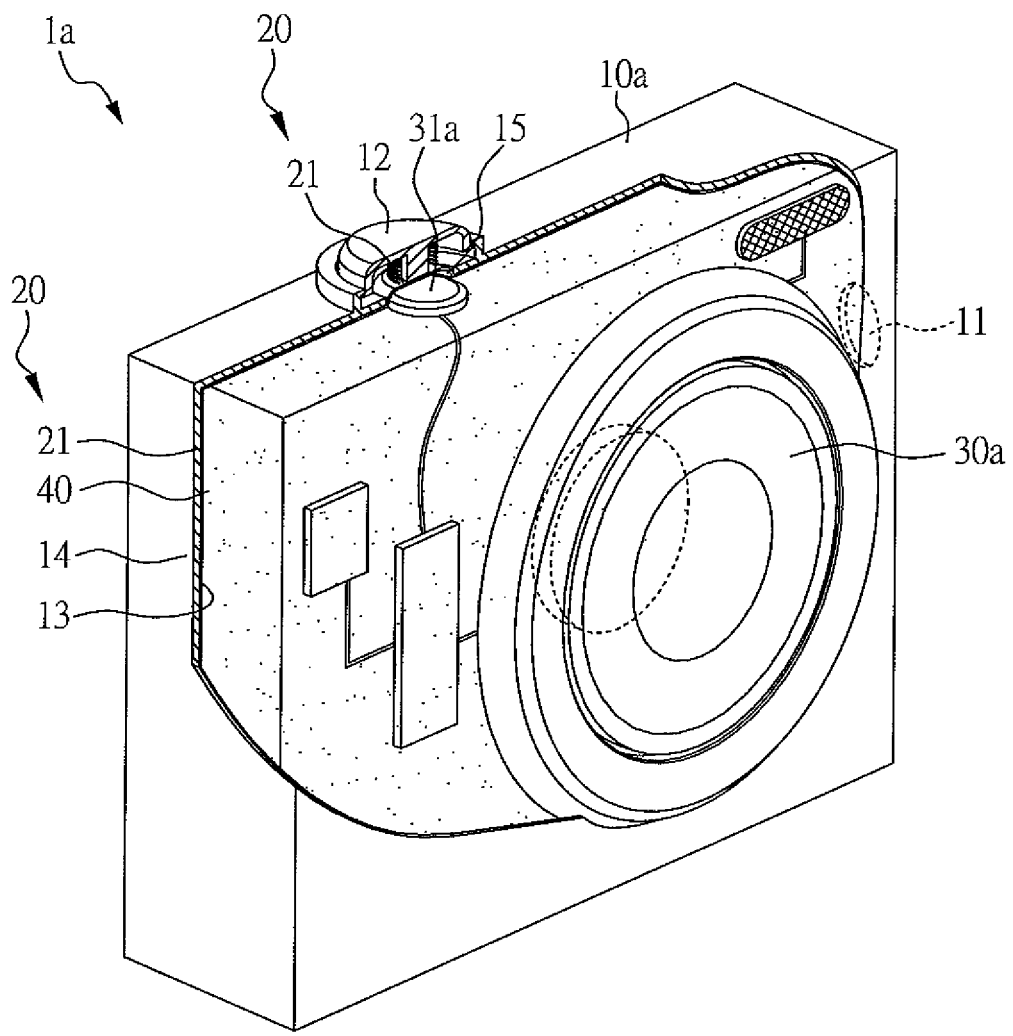
FIG. 1 illustrates a partial schematic drawing of a device with a waterproof function according to the present invention.

FIG. 1 illustrates a partial schematic drawing of the device with a waterproof function 1a according to the present invention, wherein the device with a waterproof function 1a is a camera with a waterproof function. The device includes a case 10a, at least one sealant 20, an image capture module 30a and a liquid 40.

The case 10a further includes a hole 11, a button 12, an inner side 13, an outer side 14 and a button opening 15. The number of the button openings 15 may be one or more. According to the embodiment, the at least one sealant 20 is at least one elastic film 21. The material of the film may be rubber or another material having high elasticity. The material may be extended when force is applied on it and return to the original state when the force is removed. The at least one sealant 20 is used to connect the hole 11 on the case 10a and the at least one button opening 15. Thus, the elastic film 21 and the case 10a form a closed space.

The image capture module 30a is connected to the case 10a. As shown in the figure, the module includes the necessary units in an electronic camera device, such as a circuit board, a camera lens embedded on the circuit board, a photoflash, a CCD (Charge-coupled Device), a control unit, a control circuit, a screen and a camera shutter 31a.

The liquid 40 is fully contained in the closed space between the case 10a and the elastic film 21. According to the embodiment, the liquid is not a corrosive liquid, so it may be, but is not limited to, pure water or an oily liquid. The liquid 40 may also be other appropriate fluids which may not cause corrosion to the inner units. The low-compressibility of the liquid 40 is able to counter exterior water pressure on the device. When the user uses the device with a waterproof function 1a filled with the liquid 40 inside, compared to the state of being filled with air, the case 10a of the embodiment of the present invention will not be deformed by water pressure. In addition, the liquid 40 may be used to transmit pressure from the button pressed by the user, which avoids the influence of the prior art on the shutter button 31a.

It should be noted that the one button opening 15 shown in FIG. 1 is illustrated for reference only, and that the number of the openings is not limited to one. The number of the button opening 15 may also be more than one according to the design needs of the image capture module 30a.

Figure 2:
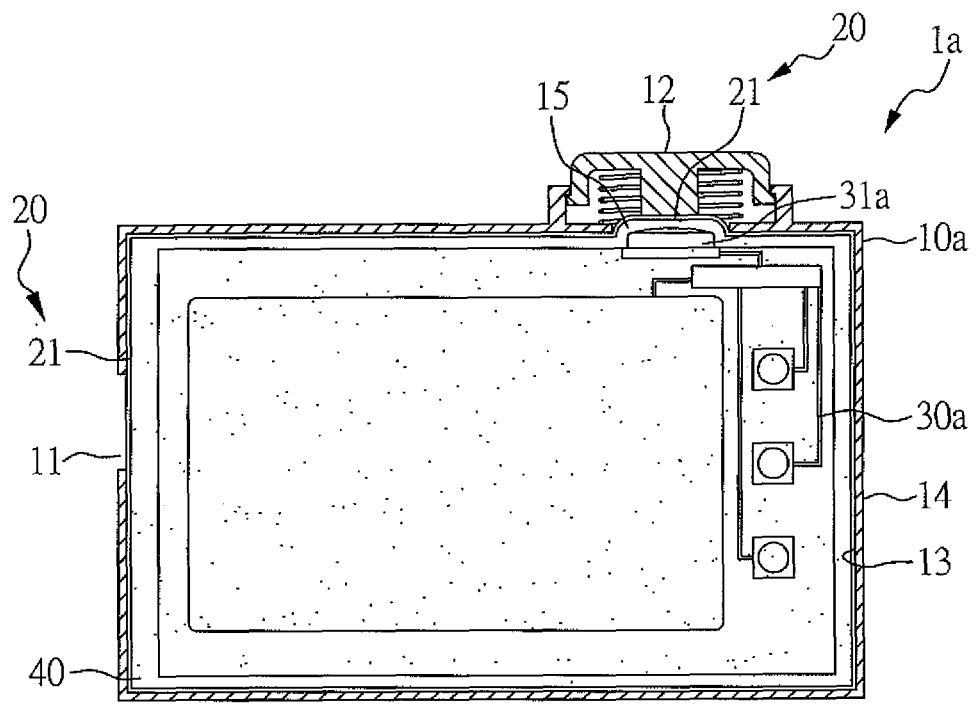
FIG. 2 illustrates a schematic drawing of a device with a waterproof function according to the first embodiment of the present invention showing the button in the undepressed state.
Figure 3:
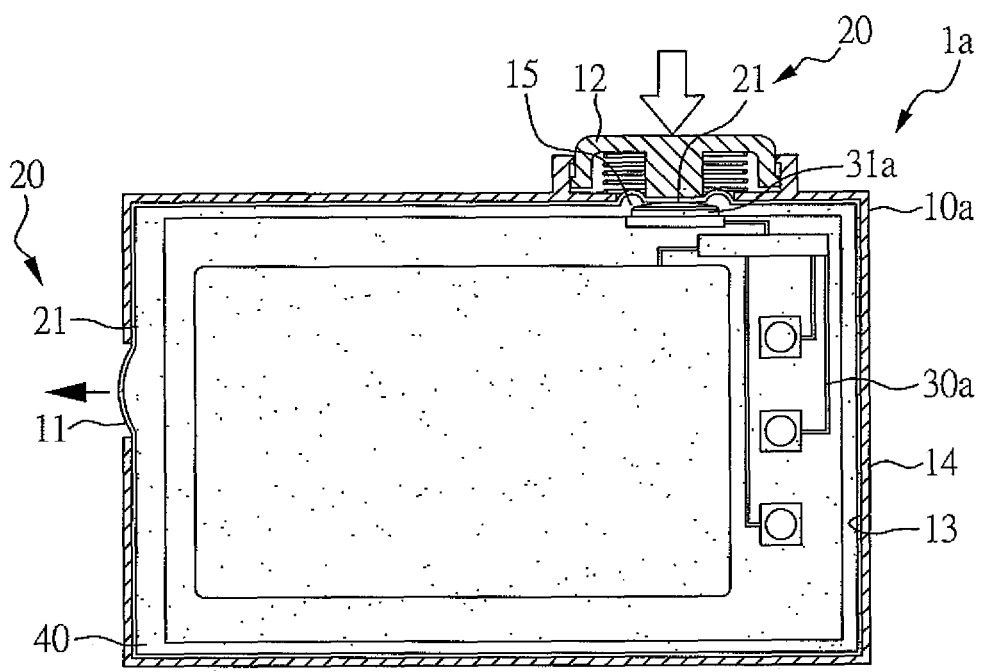
FIG. 3 illustrates a schematic drawing of a device with a waterproof function according to the first embodiment of the present invention showing the button in the depressed state.

Please refer to the embodiments illustrated in FIG. 2 to FIG. 7. The at least one sealant 20 may be at least one elastic film 21. According to different methods of connection between the elastic film 21 and the hole 11 of the case 10a, the inner side 13, the outer side 14, and the button opening 15, each different embodiment is as follows:

Please refer to FIG. 2 and FIG. 3, which illustrate the first embodiment of the present invention. FIG. 2 shows the button 12 in the undepressed state. FIG. 3 shows the button 12 in the depressed state. The elastic film 21 of the embodiment is a closed sealant that forms a closed space and is connected to the inner side 13. Through the above-mentioned mechanism of the device with a waterproof function 1a, when a user presses the button 12, the shutter button 31a and the partial elastic film 21 sealing the button opening 15 and connected to the button 12 are also pressed by the force from the user. Therefore, the liquid 40 will be under pressure from the elastic film 21 and some liquid 40 will flow towards the hole 11.

Another part of the elastic film 21 that seals the hole 11 and is not connected to the inner side 13 is elastic, so it will be pushed outward by the pressure of the liquid 40 and forms the shape of a bulge. Thus, the influence of water pressure on the shutter button 31a may be reduced, and a user will be able to smoothly press the button to operate the device.

Figure 4:
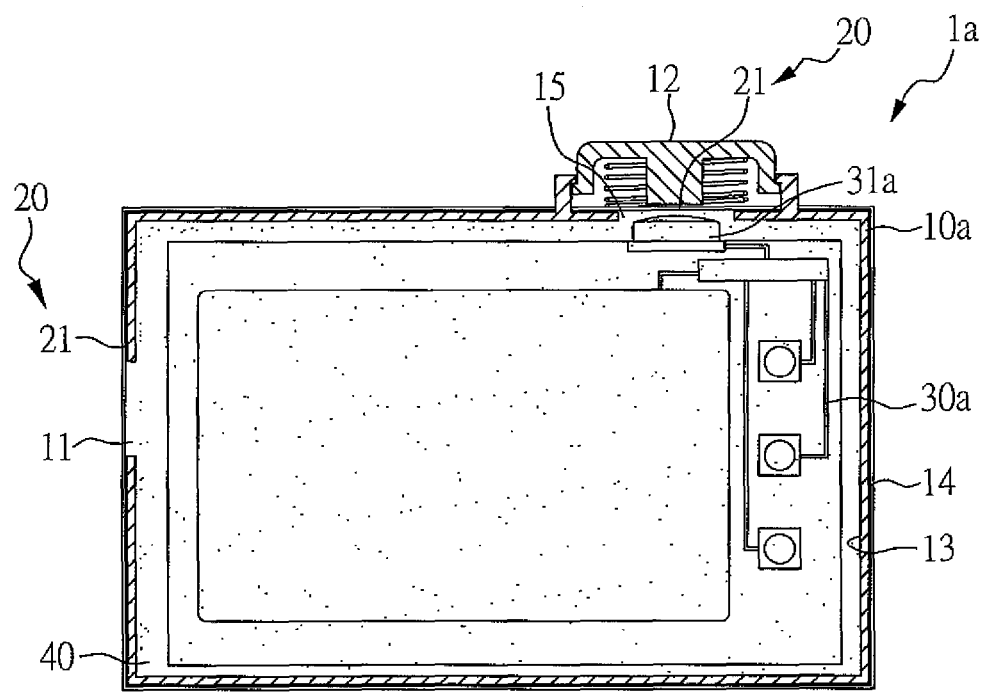
FIG. 4 illustrates a schematic drawing of a device with a waterproof function according to the second embodiment of the present invention showing the button in the undepressed state.
Figure 5:
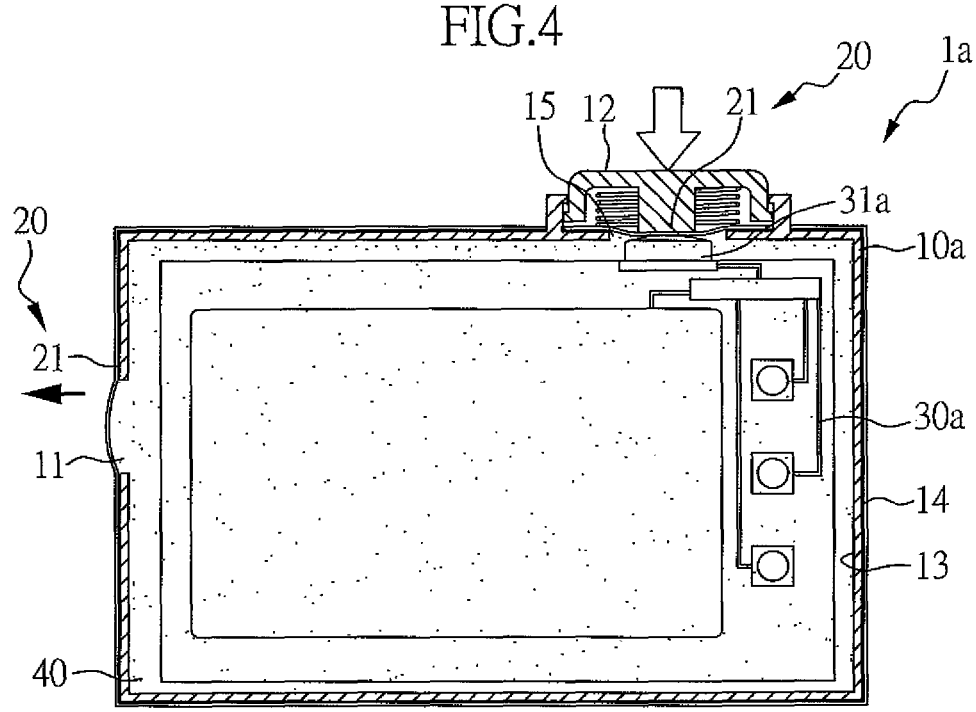
FIG. 5 illustrates a schematic drawing of a device with a waterproof function according to the second embodiment of the present invention showing the button in the depressed state.

Now please refer to FIG. 4 and FIG. 5, which illustrate a second embodiment of the present invention. FIG. 4 shows the button 12 in the undepressed state. FIG. 5 shows the button 12 in the depressed state. The elastic film 21 of the embodiment is also a close sealant that forms a closed space, and the film connects to the outer side 14, which is the only difference from the first embodiment, and the rest is the same.

Through the above-mentioned mechanism of the device with a waterproof function 1a, this embodiment is identical to the first embodiment and the same effect may be achieved.

Figure 6:
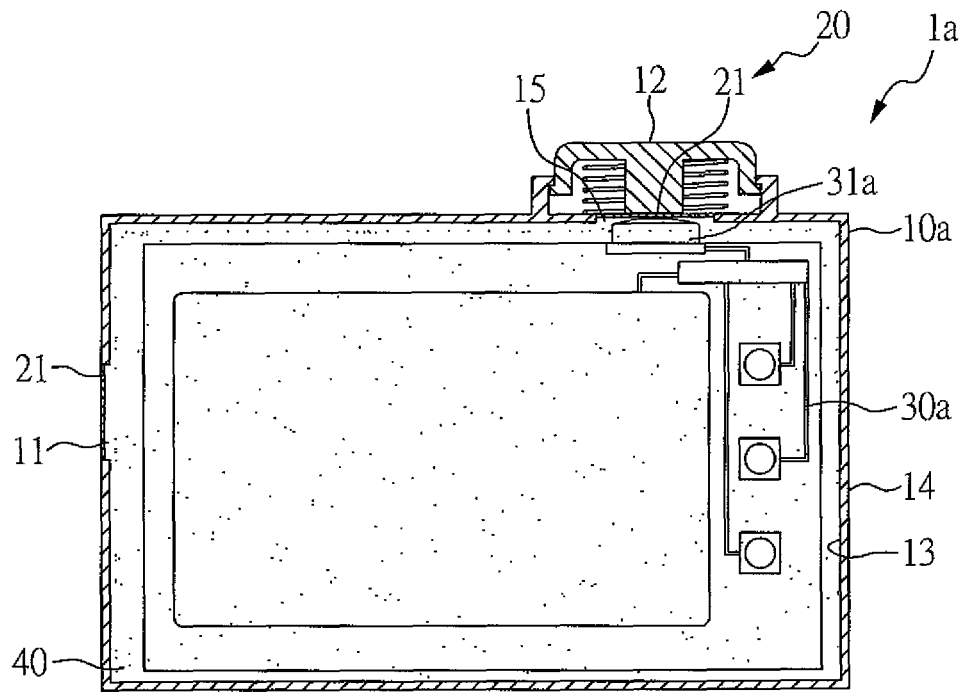
FIG. 6 illustrates a schematic drawing of a device with a waterproof function according to the third embodiment of the present invention showing the button in the undepressed state.
Figure 7:
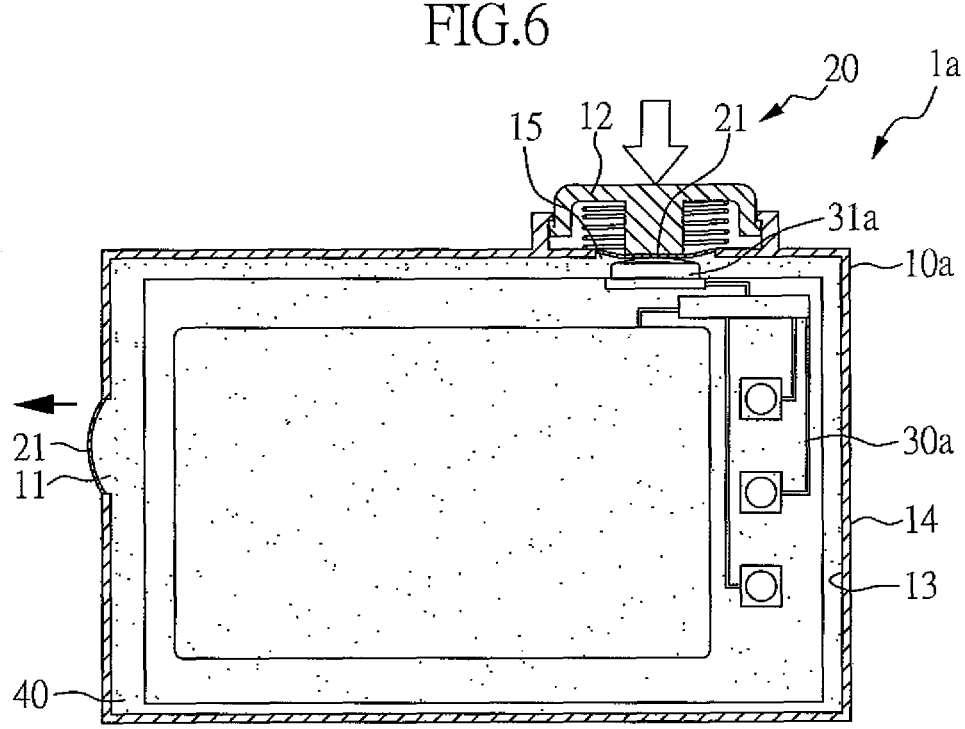
FIG. 7 illustrates a schematic drawing of a device with a waterproof function according to the third embodiment of the present invention showing the button in the depressed state.

Now please refer to FIG. 6 and FIG. 7, which illustrate a third embodiment of the present invention. FIG. 6 shows the button 12 in the undepressed state. FIG. 7 shows the button 12 in the depressed state. The number of the elastic films 21 of the embodiment may be at least two. The films are connected to the case 10 and seal the hole 11 and the button opening 15. Except for the elastic film 21, other mechanisms are identical to the first embodiment and the second embodiment. Through the above-mentioned mechanism of the device with a waterproof function 1a, this embodiment is identical to the first embodiment and the same effect may be achieved.

Figure 8:
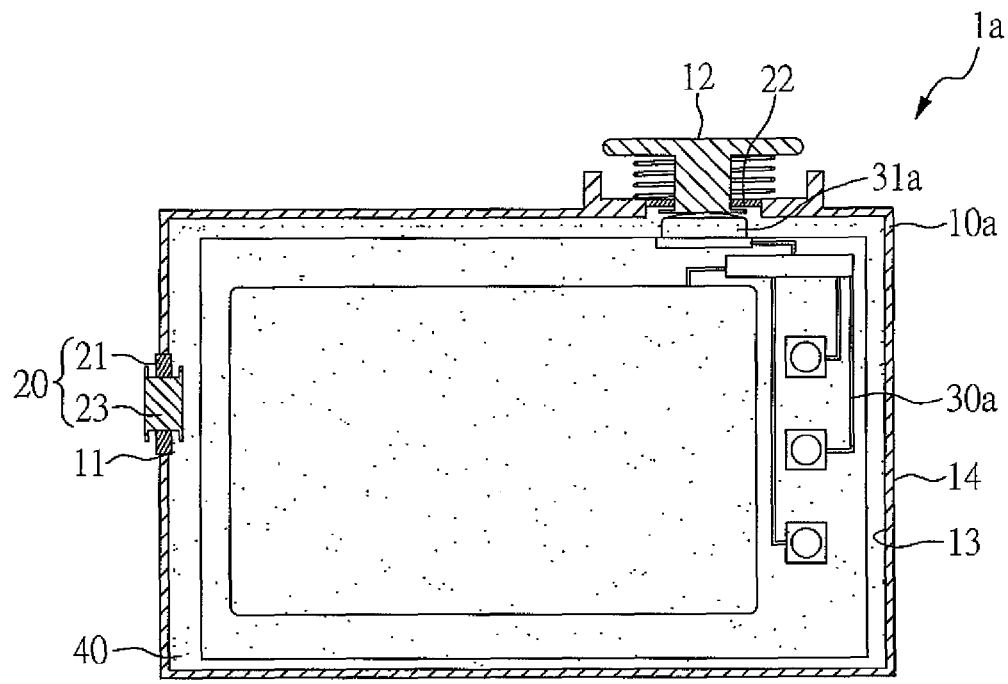
FIG. 8 illustrates a schematic drawing of a device with a waterproof function according to the fourth embodiment of the present invention showing the button in the undepressed state.
Figure 9:
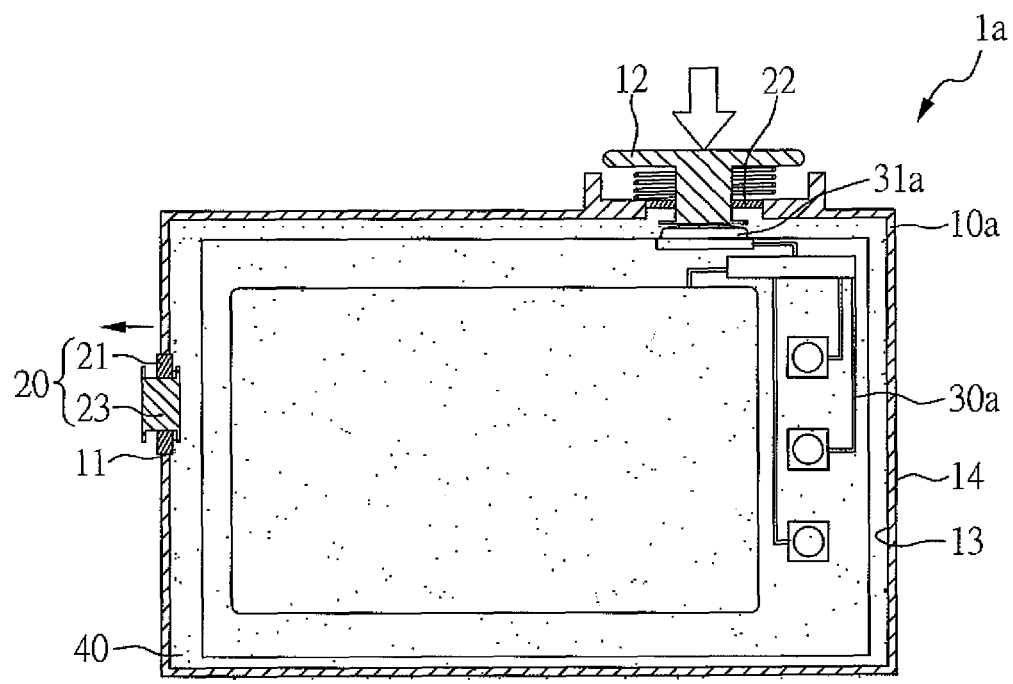
FIG. 9 illustrates a schematic drawing of a device with a waterproof function according to the fourth embodiment of the present invention showing the button in the depressed state.

Now please refer to FIG. 8 and FIG. 9, which illustrate a fourth embodiment of the present invention. The at least one sealant 20 is a combination of at least one plunger 23 and at least one waterproof ring 22. In a better embodiment, two waterproof rings 22 and two plungers 23 are suggested. The waterproof ring 22 may be an O-ring used in common engineering. The plunger 23 may be a movable object which is able to seal a hole and connects to the hollow part of the waterproof ring 22. The mentioned combination connects to the hole 11, the button opening 15 and the case 10a to form a closed space so as to prevent leakage of the liquid 40.

FIG. 8 shows the button 12 in the undepressed state. FIG. 9 shows the button in the depressed state. Except for the combination of the plunger 23 and the waterproof ring 22, other mechanisms are identical to the first embodiment to the third embodiment. Through the above-mentioned mechanism of the device with a waterproof function 1a, this embodiment is identical to the first embodiment to the third embodiment and the same effect may be achieved.

Figure 10:
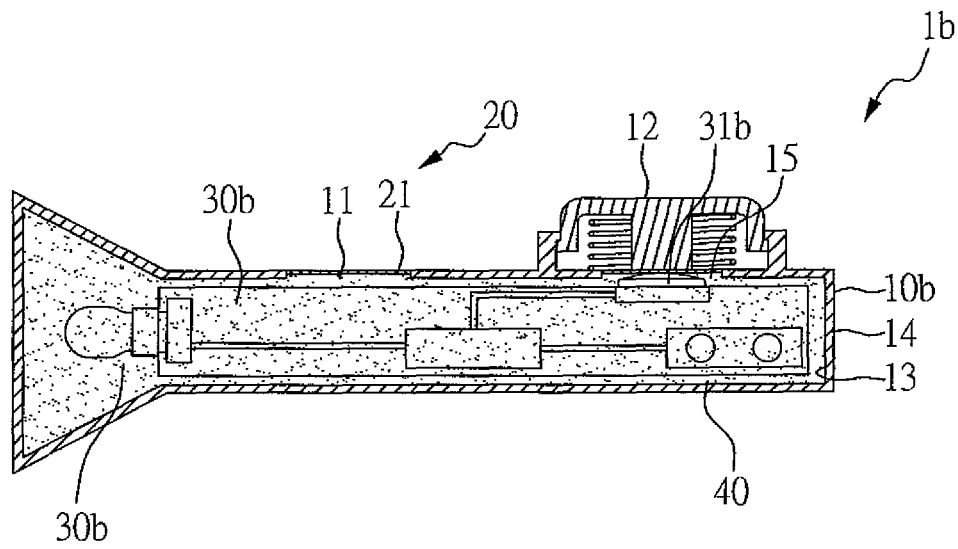
FIG. 10 illustrates a schematic drawing of a device with a waterproof function according to the fifth embodiment of the present invention showing the button in the undepressed state.
Figure 11:
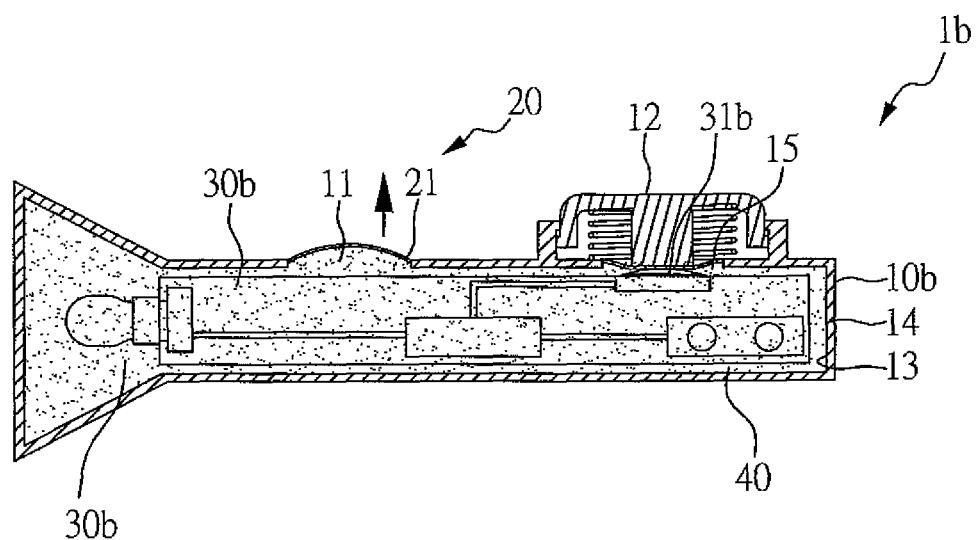
FIG. 11 illustrates a schematic drawing of a device with a waterproof function according to the fifth embodiment of the present invention showing the button in the depressed state.

Now please refer to FIG. 10 and FIG. 11, which illustrate a fifth embodiment of the present invention. The device with a waterproof function 1b may be a flashlight with a waterproof function and includes a case 10b, at least one sealant 20, a lighting module 30b and a liquid 40.

The case 10b further includes a hole 11, a button 12, an inner side 13, an outer side 14 and a button opening 15. According to the embodiment, the at least one sealant 20 is at least one elastic film 21. The material of the film may be rubber or another material with elasticity. The material may be extended when a force is applied on it and may return to the original state when the force is removed. The at least one sealant 20 is used to connect the hole 11 on the case 10b and the at least one button opening 15. Thus, the elastic film 21 and the case 10b form a closed space. The lighting module 30b is connected to the case 10b. The module includes the necessary units of a lighting electronic device, such as a circuit board, a light bulb embedded on the circuit board, a battery, a control unit, a control circuit and a switch 31b.

The liquid 40 is fully contained in the closed space between the case 10b and the elastic film 21. According to the embodiment, the liquid is not a corrosive liquid, so it can be, but is not limited to, pure water or an oily liquid. The liquid 40 may also be other appropriate fluids which will not corrode the inner units. The low-compressibility of the liquid 40 is able to withstand external water pressure on the device. When the user uses the device with a waterproof function 1b filled with the liquid 40 inside, as comparing to the state of being filled with air, the case 10b of the embodiment of the present invention will not be deformed by water pressure. In addition, the liquid 40 may be used to transmit pressure from a button pressed by the user, which avoids the influence of the prior art on the shutter button 31b.

FIG. 10 shows the button 12 in the undepressed state. FIG. 11 shows the button 12 in the depressed state. The number of the elastic films 21 of the embodiment may be at least two. The films are connected to the case 10 and seal the hole 11 and the button opening 15. Through the above-mentioned mechanism of the device with a waterproof function 1b, when a user presses the button 12, the switch 31b and the partial elastic film 21 sealing the button opening 15 and connecting to the button 12 are also pressed by the force from the user. Therefore, the liquid 40 is under pressure from the elastic film 21, and some liquid 40 will flow towards the hole 11. Another part of the elastic film 21 that seals the hole 11 and is not connected to the inner side 13 is elastic, so it will be pushed outward by the pressure of the liquid 40 to form the shape of a bulge. Thus, the influence of water pressure on the switch 31b may be reduced, and a user will be able to smoothly press the button.

The embodiment is for reference only, so the sealant 20 is described as having the same configuration as the third embodiment. However, the present invention is not limited to this configuration. The sealant 20 may also be an elastic film 21 that is a closed sealant shown in the first embodiment and the second embodiment to connect to the inner side 13 and the outer side 14; or the sealant 20 may also be a combination of at least one plunger 23 and at least one waterproof ring 22 shown in the fourth embodiment.

Although the present invention has been explained in relation to its preferred embodiments, it is to be understood that many other possible modifications and variations can be made without departing from the spirit and scope of the invention as hereinafter claimed. For example, the device with a waterproof function 1 may also be a diving watch, a video camera, or a wearable device so as to help a user to smoothly press any button while underwater.

What is claimed is:

1. A device with a waterproof function comprising:
   a case comprising a hole and a button;
   an electrical module connecting with the case;
   at least one sealant used to seal the hole and form a closed space by connecting the sealant and the case; and
   a liquid contained in the closed space; wherein when the button is pressed, the liquid is under pressure and the at least one sealant will be pushed outward by the pressure and form the shape of a bulge.

2. The device with a waterproof function as claimed in claim 1, wherein the case further comprises at least one button opening, and the number of the at least one button openings may be 2 in order to seal the hole and the at least one button opening.

3. The device with a waterproof function as claimed in claim 2, wherein the sealant is an elastic film.

4. The device with a waterproof function as claimed in claim 3, wherein the case comprises an inner side and an outer side, and the elastic film is connected with the inner side.

5. The device with a waterproof function as claimed in claim 3, wherein the case comprises an inner side and an outer side, and the elastic film is connected with the outer side.

6. The device with a waterproof function as claimed in claim 4, wherein the elastic film is a sealing film forming a closed space.

7. The device with a waterproof function as claimed in claim 5, wherein the elastic film is a sealing film forming a closed space.

8. The device with a waterproof function as claimed in claim 2, wherein the sealant further comprises at least one waterproof ring and at least one plunger.

9. The device with a waterproof function as claimed in claim 1, wherein the liquid is an oily liquid.

10. The device with a waterproof function as claimed in claim 2, wherein the liquid is an oily liquid.

11. The device with a waterproof function as claimed in claim 3, wherein the liquid is an oily liquid.

12. The device with a waterproof function as claimed in claim 4, wherein the liquid is an oily liquid.

13. The device with a waterproof function as claimed in claim 5, wherein the liquid is an oily liquid.

14. The device with a waterproof function as claimed in claim 6, wherein the liquid is an oily liquid.

15. The device with a waterproof function as claimed in claim 7, wherein the liquid is an oily liquid.

* * * * *